United States Patent
Lempia et al.

(10) Patent No.: US 11,971,728 B1
(45) Date of Patent: Apr. 30, 2024

(54) PLATFORM GUIDANCE SYSTEM INCORPORATING HIERARCHICAL MODULAR ARBITRATION ARCHITECTURE

(71) Applicant: Rockwell Collins, Inc., Cedar Rapids, IA (US)

(72) Inventors: David L Lempia, Center Point, IA (US); Jack Jordan, Cedar Rapids, IA (US); Bryan M. Krawiec, Ashburn, VA (US); John D. Anderson, Cedar Rapids, IA (US); Amy Lindaman, Cedar Rapids, IA (US); Christopher M. Boggs, Gainesville, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 453 days.

(21) Appl. No.: 17/079,244

(22) Filed: Oct. 23, 2020

(51) Int. Cl.
G05D 1/08 (2006.01)
G05D 1/00 (2006.01)
G06N 20/00 (2019.01)

(52) U.S. Cl.
CPC ......... G05D 1/0808 (2013.01); G05D 1/0016 (2013.01); G06N 20/00 (2019.01)

(58) Field of Classification Search
CPC ..... G05D 1/0808; G05D 1/0016; G06N 20/00
See application file for complete search history.

(56) References Cited

U.S. PATENT DOCUMENTS

| | | | |
|---|---|---|---|
| 4,716,523 A | 12/1987 | Burrus et al. | |
| 8,082,378 B1 | 12/2011 | Pritchard et al. | |
| 8,424,000 B2 | 4/2013 | Vijay et al. | |
| 9,310,222 B1* | 4/2016 | Suiter | G08G 5/0091 |
| 9,530,412 B2 | 12/2016 | Selfridge | |
| 9,552,271 B1* | 1/2017 | Fetta | G05B 19/0428 |
| 10,108,189 B2 | 10/2018 | Figard et al. | |
| 10,535,272 B2 | 1/2020 | Groden et al. | |
| 10,642,270 B2 | 5/2020 | Duda et al. | |
| 2011/0082717 A1 | 4/2011 | Saad et al. | |
| 2017/0369190 A1* | 12/2017 | Ethington | B64F 5/60 |

(Continued)

FOREIGN PATENT DOCUMENTS

CN 105182988 A 12/2015

*Primary Examiner* — Geepy Pe
*Assistant Examiner* — Clint Pham
(74) *Attorney, Agent, or Firm* — Kinney & Lange, P.A.

(57) ABSTRACT

A hierarchical modular arbitration architecture for a mobile platform guidance system is disclosed. In embodiments, the architecture comprises a hierarchy of arbitration layers, each arbitration layer narrower in scope than the layer above (e.g., mission objective arbitrators, route arbitrators, path arbitrators). Each arbitration layer includes one or more objective-based arbitrators in communication with one or more applications or modes. Each arbitrator receives control input (e.g., from the pilot, from aircraft sensors) and control signals from the level above, selecting a mode to make active based on decision agents within the arbitrator layer which control mode priorities and sequencing (e.g., some flight objectives may involve multiple arbitrators and their subject applications coordinating in sequence). Each arbitrator passes control signals associated with fulfilling the commands of the active mode to the level below and reports application and error information to the arbitrator level above and/or human/artificial pilot machine interfaces.

17 Claims, 8 Drawing Sheets

(56) References Cited

U.S. PATENT DOCUMENTS

| | | |
|---|---|---|
| 2019/0235500 A1 | 8/2019 | O'Brien et al. |
| 2019/0324456 A1 | 10/2019 | Ryan et al. |
| 2020/0241565 A1 | 7/2020 | Bosworth et al. |
| 2020/0299001 A1* | 9/2020 | Restifo .................. G06F 30/20 |
| 2020/0301971 A1* | 9/2020 | Skarica ................ B64C 39/024 |
| 2020/0302026 A1* | 9/2020 | Restifo ............... G06F 11/3664 |

* cited by examiner

316

| REQUESTS | HOLD 208d | APP 1 208a | APP 2 208b | APP 3 208c |
|---|---|---|---|---|
| on ACTIVE, REQUEST ARM 318a | 1 ◆——[410]→<br>2 ◆———————————→ | 1 ◆——[414]→<br>2 ◆—————————→ | [412]→<br><br>1 ◆——[416]→ | |
| on INACTIVE, REQUEST ACTIVE 318c | ←- - - ●←[418]- - -●  1<br>←[422]- - - - - - - -●  2<br>←[420]- - - - - - - - - - - - -●  1 | | | |

| ARBITRATOR AXIS | LATERAL 302 | VERTICAL 306 | LONG. 304 |
|---|---|---|---|
| MODE/BEHAVIOR | LatApp 1 308 | VertApp 2 310 | LongApp 4 312 |
| on ACTIVE, REQUEST ARM 318a | ○——[502]→○——[504]→ | | |
| on INACTIVE, REQUEST INACTIVE 318c | ○- -[506]→○- -[508]→<br>○- - - - - - - - - -[510]→<br>←- - - - - ○←- - - - ○<br>←- - - - - - - - - - - - ○ | | |

FIG. 5

PLATFORM GUIDANCE SYSTEM INCORPORATING HIERARCHICAL MODULAR ARBITRATION ARCHITECTURE

BACKGROUND

Avionics systems, especially military-grade implementations, must be able to adapt quickly to emerging and evolving technological and strategic threats. However, many flight guidance systems and other like control-intensive software architectures are highly complex and interconnected, which precludes easy and/or inexpensive modular upgrades. For example, a change or upgrade to one flight guidance component may require numerous other external updates to accommodate the change. While this level of complexity is of course associated with higher upgrade costs, it also introduces a higher probability of error.

SUMMARY

A guidance system for a mobile platform (e.g., an aircraft, ground vehicle, or water-based vehicle) incorporating a hierarchical vehicle arbitration architecture is disclosed. In embodiments, the guidance system includes a hierarchy of arbitration layers. Each arbitration layer is concerned with increasingly narrowly focused flight or performance objectives, e.g., a topmost layer directed to managing goal or mission behaviors and a lowermost layer directed to controlling individual actuators or control surfaces, each Mth arbitration layer narrower in scope than the layer above. Each arbitration layer includes a group of arbitrators, each arbitrator directed to a specific objective or behavior and controlling one or more applications. Each application may have an inactive, armed, and active state, and executes specific vehicular functions when active toward the fulfillment of the associated objective or behavior. Each arbitration layer includes decision agents including decision modules, e.g., configuration files and/or trained artificial intelligence (AI) routines for coordinating the associated applications. Each arbitrator receives control input from the arbitrator layer directly above (or, e.g., from the operator), the control input corresponding to a specific objective to fulfill. Each arbitrator, in coordination with the decision agents, selects one associated application at a time to become active and execute its assigned functions toward fulfillment of the objective or behavior. The arbitrators transmit control signals (e.g., associated with continued fulfillment of the objective or behavior via lower-level functions) to the arbitration layer immediately below, and transmit application status information (e.g., based on the original control input received) back up to the arbitration layer immediately above. The control output generated by the executing applications (e.g., maps, cues, display elements, limits), application status information, and control signals are forwarded to operator interfaces and/or display systems for presentation to the pilot/operator of the mobile platform.

In some embodiments, the decision agents assign priority levels to the associated applications. For example, if multiple applications in an armed state request transition to the active state, the arbitrator selects for transition the armed application having the higher priority.

In some embodiments, the decision agents include arbitrator transition tables associated with the assigned priorities.

In some embodiments, the decision agents include decision modules trained according to machine learning techniques to assign priorities and select applications for transition.

In some embodiments, one or more arbitrator layers include multiple arbitrators configured for fulfilling a particular objective or behavior in coordination with each other.

In some embodiments, the decision agents include layer transition tables configured (e.g., via configuration files or AI modules) for managing the coordination of multiple arbitrators.

In some embodiments, control input includes sensor input generated by one or more onboard sensors and operator input manually provided by the pilot or operator, e.g., via the operator interfaces and/or interactive display systems.

In some embodiments, the guidance system includes a layer manager configured for isolating the vehicle arbitration architecture from the operator interfaces. For example, the layer manager may receive the manual operator input. Similarly, the layer manager receives control signals and/or application status information provided by the arbitration layers for presentation to the operator. Based on the control signals and application status information, the layer manager may direct the operator interface to display command cues.

In some embodiments, the operator selects, via the operator interface, specific arbitration layers for direct interaction (e.g., other than the highest arbitration layer). The layer manager provides relevant operator input to the selected arbitration layers.

In some embodiments, the applications are capable of altering reference values. The layer manager synchronizes any altered reference values throughout the vehicle arbitration system.

In some embodiments, the layer manager evaluates the validity of received control signals and application status information, and may include with displayed command cues alerts or warnings based on the validity (or invalidity) of the control signals and application status information.

In some embodiments, the operator may be a human pilot, an artificial pilot, or a remote operator. For example, the operator interfaces can include human/machine interfaces (HMI), artificial pilot machine interfaces (APMI), and/or interactive display systems (e.g., capable of accepting control input as well as presenting information to the operator).

In some embodiments, the arbitrators of a given Mth arbitration layer may bypass the immediately adjacent higher arbitration layers. For example, the Mth arbitration layer may receive control input from other higher arbitration layers (e.g., the (M+2)nd through Nth arbitration layers of an N-layer architecture) not directly adjacent, and transmit application status information back to the higher non-adjacent layers.

In some embodiments, the arbitrators of a given Mth arbitration layer may bypass the immediately adjacent lower arbitration layers. For example, the Mth arbitration layer may transmit control input to other lower arbitration layers (e.g., the (M−2)nd through lowest arbitration layers) not directly adjacent, and receive application status information back from the lower non-adjacent layers.

In some embodiments, available arbitration layers may be selected from goal-based or mission-based layers; route-based layers (e.g., directed to executing one or more paths between a first location and a second location); path-based layers (e.g., directed to completing a specific straight or arc path); attitude-based layers (e.g., directed to maintaining a particular vehicular attitude); control-based layers (directed to implementing directional control input via actuators, control surfaces, etc.); and actuator-based layers directed to controlling specific actuators or control surfaces of the vehicle.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4B is a tabular illustration of an arbitrator transition table of the vehicle arbitration system of FIG. 1;

FIG. 5 is a tabular illustration of a layer transition table of the vehicle arbitration system of FIG. 1;

DETAILED DESCRIPTION

Figure 1:
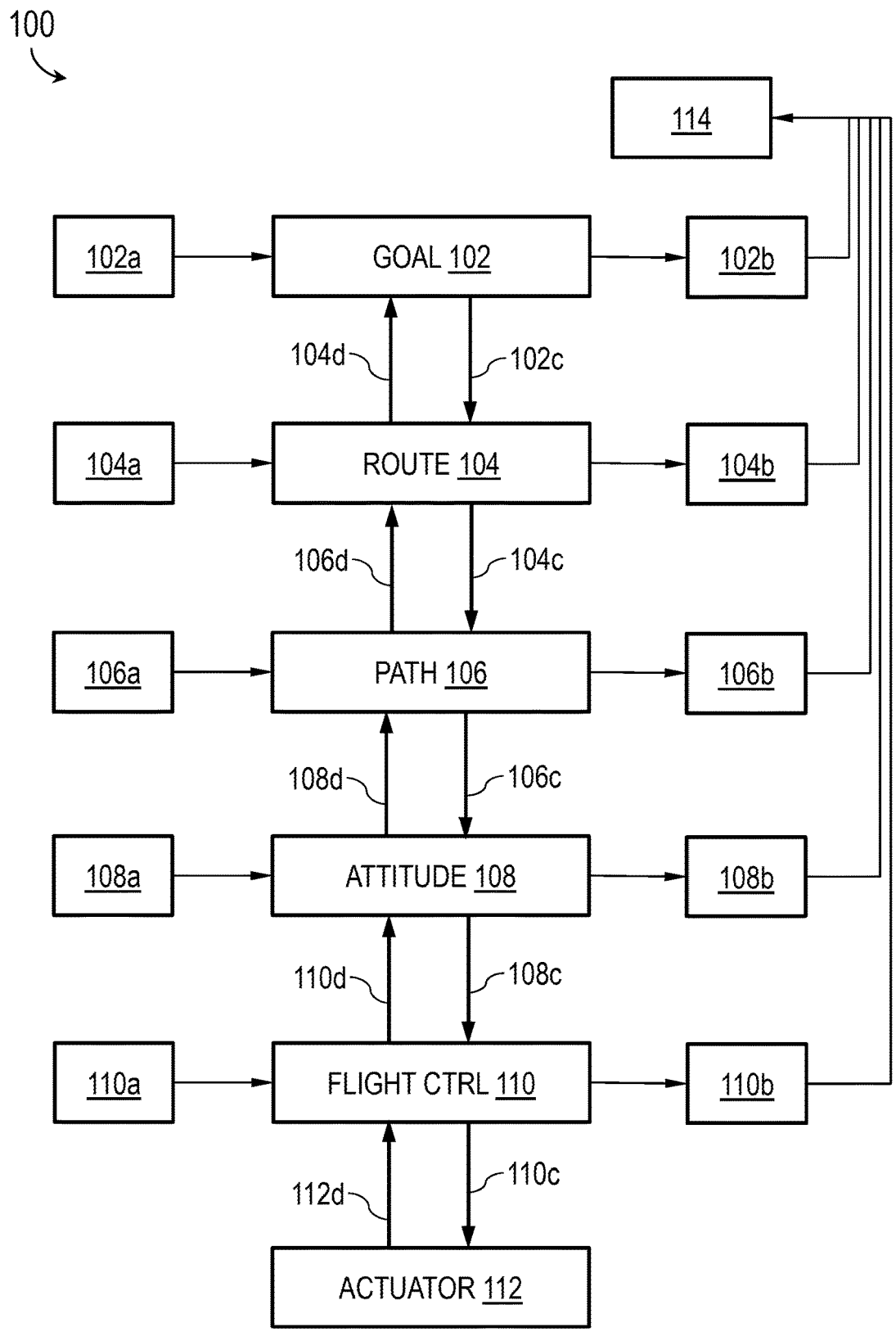
FIG. 1 is a block diagram illustrating a modular vehicle arbitration system according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIG. 1—System Overview

Broadly speaking, embodiments of the inventive concepts disclosed herein are directed to a modular vehicle arbitration architecture for flight guidance systems and other similarly control-intensive vehicular control systems (e.g., avionics control systems or like control systems for ground-based or water-based mobile platforms). Multilayered arbitration functions select which applications are active, and in control of the aircraft or vehicle, at any moment. Applications request control from, and release control back to, the arbitrator. The arbitrators are arranged in a hierarchy of layers based on common behaviors employed by an operator of the vehicle (e.g., a human or artificial pilot, a remote operator of an unmanned aircraft system (UAS)), from the broadest mission objectives to individual control surfaces or actuators.

The open and modular nature of the system architecture enables the development of plug-and-play applications and integration of new modes while preserving historical flight director modes and applications; certification kits ensure that new applications are safe and certifiable. Flight operations may be selectively automated, and the layered control architecture allows for more precise monitoring of systems controlled by artificial intelligences. The vehicle arbitration architecture is platform-agnostic and may be adapted to fixed-wing, rotary, and unmanned aircraft platforms as needed.

Referring to FIG. 1, the modular vehicle arbitration system 100 is disclosed. The vehicle arbitration system 100 may be integrated into a flight guidance system (e.g., flight director, flight management system (FMS), flight control computer (FCC), fly-by-wire system) and may be compatible with, and exchange control input and output with, aircraft-based sensors, primary flight displays (PFD) and other aircraft display systems, and control systems configured for partially or fully autonomous control of aircraft functions or components. For example, the vehicle arbitration system 100 may be configured for execution on control processors of the flight director or FMS, or isolated on separate physical processors or virtual processors (e.g., one or more virtual machines or virtual processing cores within a multi-core processing environment).

In embodiments, the vehicle arbitration system 100 may comprise a hierarchy of layers, e.g., a goal arbitration layer 102, a route arbitration layer 104, a path arbitration layer 106, an attitude arbitration layer 108, a flight control arbitration layer 110, and an actuator arbitration layer 112. The vehicle arbitration system 100 may be scaled up or down in scope (e.g., implemented with greater or fewer than the six layers shown by FIG. 1) based on, e.g., the size and/or complexity of the embodying aircraft, or the particular mission to which the aircraft is assigned. For example, the route arbitration layer 104 and the path arbitration layer 106 may be combined in some embodiments into a single arbitration layer.

In embodiments, each arbitration layer 102-112 may group individual arbitrators, applications, and decision agents together based on common behaviors (e.g., goals, objectives) employed by the aircraft operator (e.g., human pilot, artificial pilot, partially or fully autonomous remote operator), the scope of each successive arbitration layer narrowing relative to the arbitration layer above it. For example, the arbitrators and applications of each individual arbitration layer 102-112 may receive control input (102a-110a) and may generate control output (102b-110b) relevant to the behavioral scope of the arbitration layer. For example, the goal arbitration layer 102 may incorporate applications directed to fulfilling broad mission-based goals and objectives which define operational areas, locations, and purposes and incorporate start/end times and strategies (e.g., arrive in a defined area by time X, use one or more possible search strategies and thereby locate a red automobile having a specific license plate). In embodiments, the applications of the goal arbitration layer 102 may receive control input 102a (e.g., pickup locations and times, defined surveillance areas) and may generate control output 102b (e.g., strategic maps of the surveillance areas and search techniques). Further, generated control output 102b-110b may be displayed to pilots and/or operators via flight displays 114 (e.g., primary flight displays (PFD), multifunctional displays (MFD), remote displays) for enhanced situational awareness. For example, control output may include strategic maps 102b, route maps 104b, PFD elements 106b, flight control cues and references 108b, and flight control limits 110b.

In embodiments, behaviors or operations assigned to each arbitration layer 102-110 may incorporate additional behaviors to be addressed by the arbitration layers below it, in increasingly narrow scope. For example, the route arbitration layer 104 may be directed to executing routes or flight plans in furtherance of the mission-based goals and objectives addressed by the goal arbitration layer 102. Routes may define how the embodying aircraft moves within its mission operating area, between locations, or more generally in furtherance of its flight plan. Routes may be entered by a pilot or operator, created by applications of the route arbitration layer 104, or created from a mission objective or goal addressed by the goal arbitration layer 102. Accordingly, the applications of the goal arbitration layer 102 may relay control signals (102c) to the applications of the route arbitration layer 104. Similarly, the applications of the route arbitration layer may return application status and error information (104d) up to the goal arbitration layer.

In embodiments, the control signals 102c may include, e.g., defined goals and objectives requiring specific routes to be developed and implemented by the aircraft, or predetermined routes to be executed. For example, the control signals 102c may incorporate a mission objective of traveling through a defined operational area within a defined time window while minimizing the radar signature of the aircraft. The applications of the route arbitration layer 104 may create a route to be followed by the aircraft according to one or more strategies, e.g., minimizing radar hotspots.

In embodiments, the applications of the route arbitration layer 104 may similarly forward control signals 104c down to the path arbitration layer 106 based on the developed routes. For example, the path arbitration layer 106 may be concerned with controlling the aircraft along a linear path or arc path. The fulfillment of each route (e.g., received by, or developed by, the route arbitration layer 104) may involve numerous such segments or changes in direction within the route.

In embodiments, paths may be defined by control input 106a received at the path arbitration layer 106 (e.g., manually entered by a pilot or operator) or generated by the applications of the path arbitration layer based on flight plan information included in control signals 104c received from the route arbitration layer 104. For example, the pilot may enter an instrument landing system (ILS) approach path, or a path may be created by the applications of the path arbitration layer 106 based on a current and/or subsequent leg of a route or flight plan. Paths may incorporate one or more axes of rotation (e.g., pitch/yaw/roll for a fixed-wing aircraft, lateral/vertical/longitudinal for a helicopter) and may incorporate distinct strategies for each axis (which may be passed as control signals 106c to the attitude arbitration layer 108). For example, a path consisting of a lateral arc may provide for a strategy of coordinating turn rate.

In embodiments, the attitude arbitration layer 108 may be directed to controlling the flight of the aircraft according to a specific path or command (e.g., at a specific vertical speed or according to soft flight instructions received as control input 108a). Similarly, the flight control arbitration layer 110 may be directed to controlling specific controls or control sets (e.g., stick, pedal, collective (for helicopters)). The actuator arbitration layer 112 may be directed to applications controlling individual actuators or control surfaces (e.g., gear, flaps, rotors) according to control signals 110c received from the flight control arbitration layer 110.

Figure 2A:
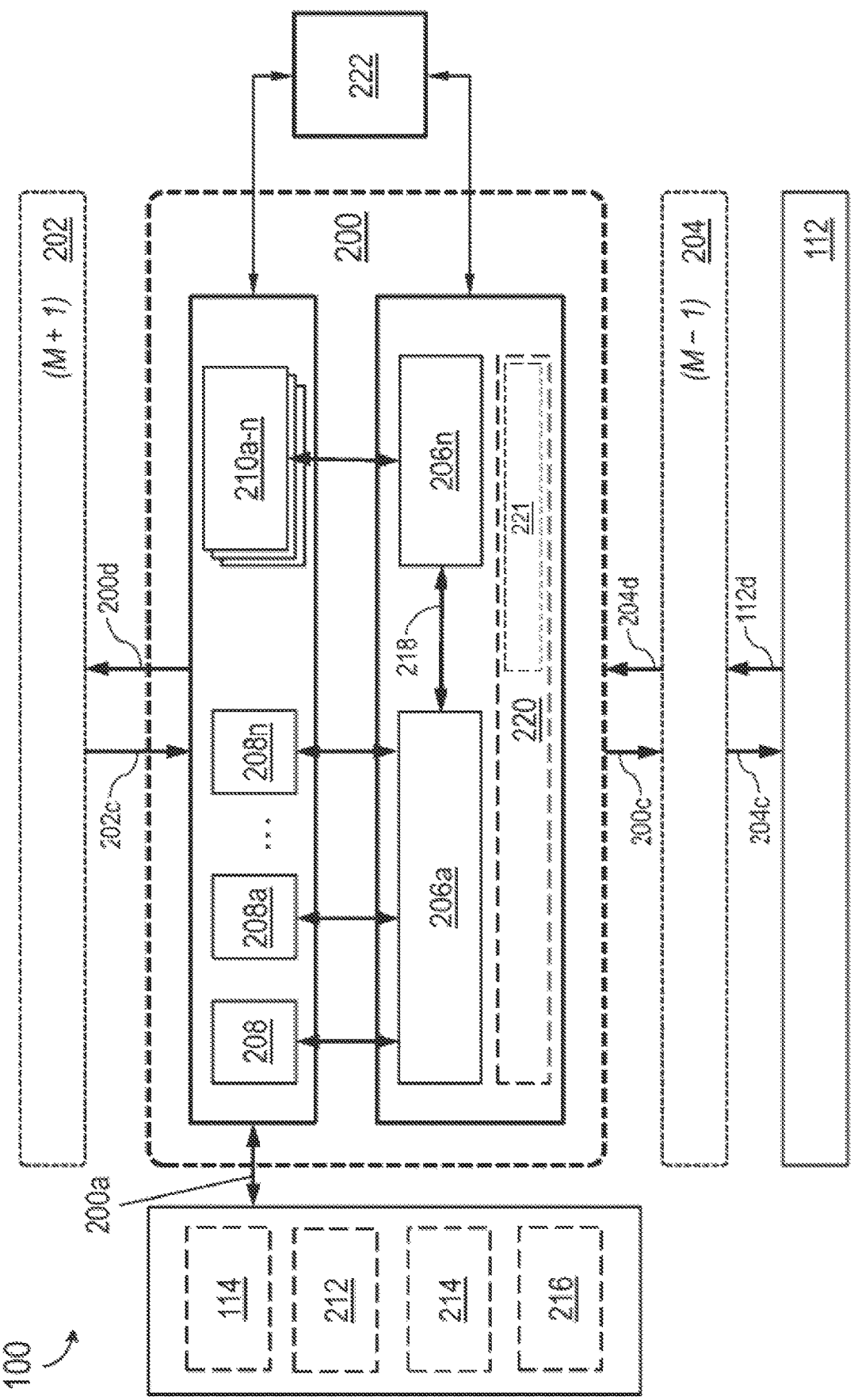
FIG. 2A is a block diagram illustrating example arbitration layers of the vehicle arbitration system of FIG. 1.

FIGS. 2A/B—Arbitration Layer Details

Referring now to FIG. 2A, the vehicle arbitration system 100 is disclosed.

In embodiments, the arbitration layer 200 may be any Mth arbitration layer between the uppermost arbitration layer (e.g., the goal arbitration layer 102, FIG. 1) and the lowermost arbitration layer (e.g., the actuator arbitration layer 112). The Mth arbitration layer 200 may be situated between two adjacent arbitration layers (an (M+1)th arbitration layer 202 and an (M−1)th arbitration layer 204) respectively situated above and below the Mth arbitration layer.

In embodiments, the Mth arbitration layer 200 (e.g., as well as each (M+1)th arbitration layer 202 and (M−1)th arbitration layer 204 above and below) may comprise a series of arbitrators 206a ... 206n, each arbitrator in communication with one or more applications 208 or sets thereof. For example, the arbitrator 206a may be in communication with applications 208, 208a-n, and the arbitrator 206n may be in communication with applications 210a-n. In embodiments, each arbitrator 206a selects one controlling application (e.g., a single application in control of the vehicle arbitration system 100) from its subject applications 208, 208a-n based on, e.g., control input 200a and/or control signals 202c received from the (M+1)th arbitration layer 202 directly above. For example, control input 200a may include, e.g., sensor input from aircraft sensors 212, or input manually or directly entered by a human pilot (e.g., via human/machine interface (HMI) 214 or interactive display system 114) or artificial intelligence interface (e.g., via artificial pilot machine interface (APMI) 216).

In embodiments, information passed between adjacent arbitration layers 200, 202, 204 may consist of standardized layer messages comprising, e.g., control signals 200c, 202c, 204c to the layer below or application status/error information 112d, 200d, 204d to the layer above. Layer transition messages 218 may pass information between arbitrators 206a-n within an arbitration layer 200.

In embodiments, each arbitration layer 200, 202, 204 may include one or more decision agents 220, wherein the one or more decision agents include at least one decision module 221. For example, decision agents 220 may include decision modules 221 comprising configuration files instructing the arbitrators 206a-n how to resolve application priority questions. One or more applications 208, 208a-n, 210a-n may request the arbitrator 206a-n grant control of the vehicle arbitration system 100; in the event that a single arbitrator 206a receives control requests from more than one application 208, 208a-n, the arbitrator selects the application having the highest priority according to application priorities outlined in the configuration files. In some embodiments, decision agents 220 may include decision modules 221 trained according to machine learning techniques (e.g., test flights directed by the vehicle arbitration system 100) to select a requesting application to be granted control of the system (based on, e.g., the current mission environment and/or aircraft state).

In embodiments, the vehicle arbitration system 100 may include certification kits 222 compatible with each arbitration layer 200-204. For example, the certification kits 222 may preserve the modular plug-and-play nature of the vehicle arbitration system 100 by ensuring that any additional arbitrator and application components added to an arbitration layer 200 are not only compatible with other arbitration layers 202, 204 but safe, secure, and certifiable. Certification kits 222 may be configured to enforce safety and certification requirements on a layer-by-layer basis (e.g., generally speaking requirements become more stringent with each lower arbitration layer as its functional focus narrows). For example, certification kits 222 may preserve application independence within each arbitration layer 200-204 and ensure that all control output (200b-204b) and control signals (200c-204c) are constrained within any applicable performance characteristics defined for the embodying vehicle.

Figure 2B:
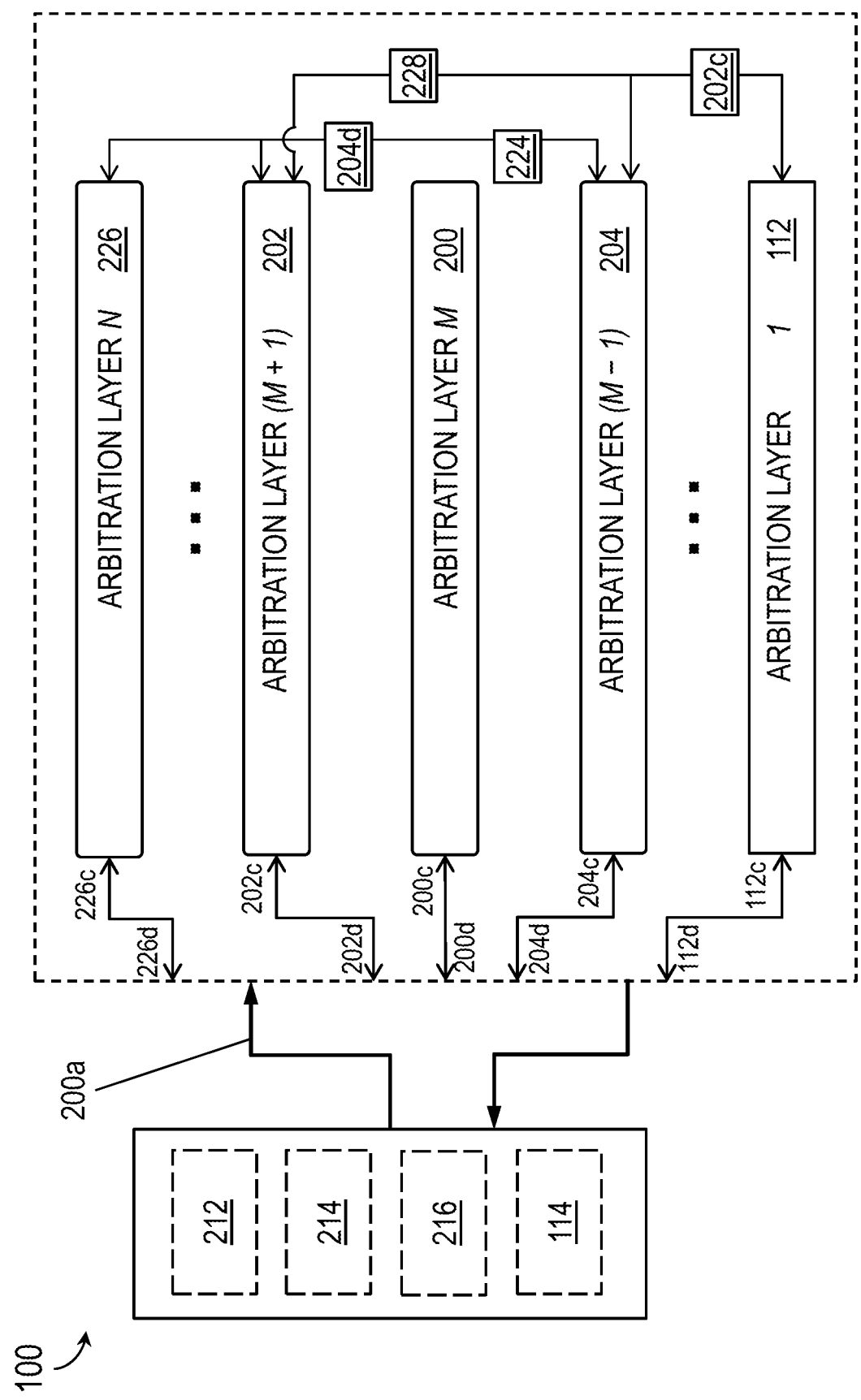
FIG. 2B is a block diagram illustrating example arbitration layers of the vehicle arbitration system of FIG. 1.

In embodiments, referring also to FIG. 2B, the vehicle arbitration system 100 may operate on an open-ended hierarchical basis, whereby arbitration layers may bypass one or more higher-level or lower level layers to exercise direct control of a non-adjacent arbitration layer. For example, the (M−1)th arbitration layer 204 may receive control input (224) from any of the Mth arbitration layer 200 through the Nth arbitration layer 226 (e.g. goal-based arbitration layer (102, FIG. 1) or the highest-level arbitration layer) above, but not directly adjacent to, the (M−1)th arbitration layer; one or more of the Mth through Nth higher layers may exercise direct control of lower-level arbitration functions (e.g., for sensor pointing or steering as opposed to following a specific straight or arc path). Accordingly, the (M−1)th arbitration layer 204 may respond by transmitting application status or error information 204d to the appropriate higher-level non-adjacent arbitration layer. Similarly, the (M+1)th arbitration layer 202 may dynamically select one or more non-adjacent lower layers (e.g., the (M−1)th arbitration layer 204 through the actuator layer 112 or lowest-level arbitration layer) to receive control input 202c at particular points in time and return application/error information 228 to the (M+1)th arbitration layer.

In embodiments, the pilot or operator may directly engage with the vehicle arbitration system 100 at any desired level of granularity or precision by transmitting control input (200a; e.g., also including control signals (112c, 200c, 202c, 204c, 226c)) directly to any desired arbitration layer (e.g., via the HMI/APMI 214/216 and/or interactive display system 114). Similarly, the Mth arbitration layer 200, the (M+1)th arbitration layer 202, the (M−1)th arbitration layer 204, or any other arbitration layer may return application status or error information (112d, 200d, 202d, 204d, 226d) to the HMI/APMI 214/216 or display systems 114 for reporting to the pilot/operator.

Figure 3A:
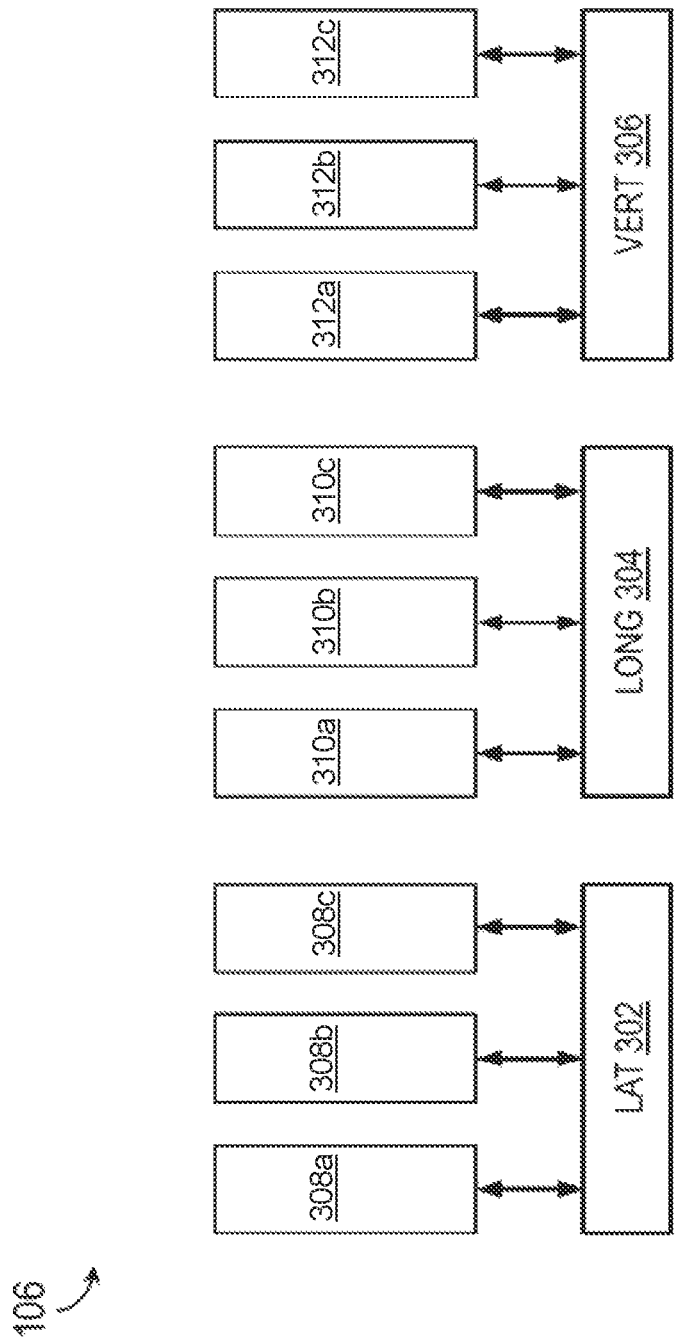
FIGS. 3A and 3B are block diagrams illustrating arbitrator operations of the vehicle arbitration system of FIG. 1.

FIG. 3A—Path Arbitrator Example

Referring now to FIG. 3A, an example of the path arbitration layer 106 is shown. The path arbitration layer may include lateral axis arbitrator 302, longitudinal axis arbitrator 304, and vertical axis arbitrator 306.

In embodiments, the arbitrators 302, 304, 306 may select one or more subject applications 308a-c, 310a-c, 312a-c to control the vehicle arbitration system 100, either individually or sequentially (e.g., multiple arbitrators coordinating to transition between subject applications in sequence) to adjust the rotational orientation of the aircraft (e.g., through the attitude, flight control, and actuator arbitration layers (FIG. 1: 108, 110, 112) below) and thereby maintain the aircraft on its current path. For example, the lateral axis arbitrator 302 may select from a heading application 308a, a localizer application 308b, and a lateral-axis flight management (FM) application 308c. Similarly, the longitudinal axis arbitrator 304 may select from a groundspeed application 310a, an airspeed application 310b, and a longitudinal-axis FM application 310c and the vertical axis arbitrator 306 may select from a barometric-altitude application 312a, a radio-altitude application 312b, and a vertical-axis FM application 312c.

Figure 3B:
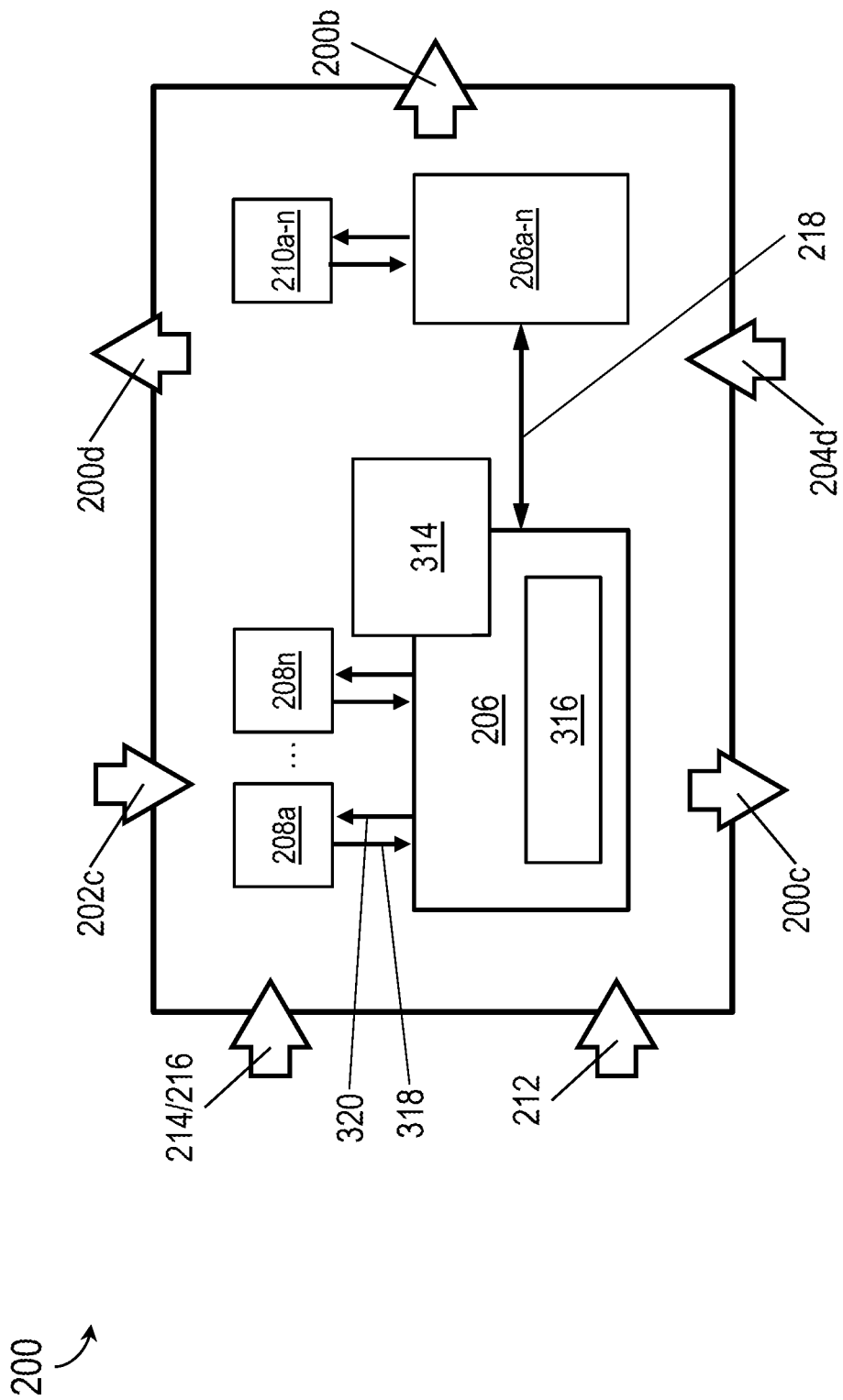

FIG. 3B—Arbitration Layer I/O Operations

Referring now to FIG. 3B, an example of the Mth arbitration layer 200 is disclosed.

In embodiments, each Mth arbitration layer 200 may include layer-specific information on aircraft performance 314 as well as the validity and priority of application state transitions. For example, the decision agents (220, FIG. 2A) may utilize arbitrator transition tables 316 for each arbitrator 206, 206a-n, outlining the validity and priority of state transitions between the subject applications 208a-n, 210a-n of that arbitrator. Each subject application 208a-n, 210a-n has an application state, which may be inactive, armed, or active. In embodiments, each arbitrator 206, 206a-n notes the state of each subject application 208a-n, 210a-n. Based on the arbitrator transition tables 316 (e.g., and control signals 202c received from the above ((M+1)th) arbitration layer (202), human/artificial pilots (214/216), and/or sensors 212), the arbitrator 206, 206a-n enables one "armed" application at a time to be "active", e.g., granting system control to the "active" application, by receiving transition requests 318 from each subject application 208a-n, 210a-n and approving transition requests via transition commands 320.

In embodiments, the arbitrator 206, 206a-n may pass control signals 200c down to the (M−1)th arbitration layer (204, FIG. 2) directly below (and may receive application status and error messages 204d therefrom). When the arbitrator 206, 206a-n selects a new "armed" subject application 208a-n to become "active", the arbitrator may seamlessly transition control signals 200c related to the final command of the previously "active" subject application to control signals related to the initial command of the newly/currently "active" subject application. In addition, the arbitrator may revise and/or align any units, orientations, and/or reference frames of control signals 200c to match control signal definitions in the (M−1)th arbitration layer 204 directly below. In embodiments, control signals 200c/202c, application status/error messages 200d/204d, and/or other situational awareness data and control output (200b) may be provided to the pilot/operator (e.g., via the HMI/APMI (214/216, FIG. 2A)).

Figure 4A:
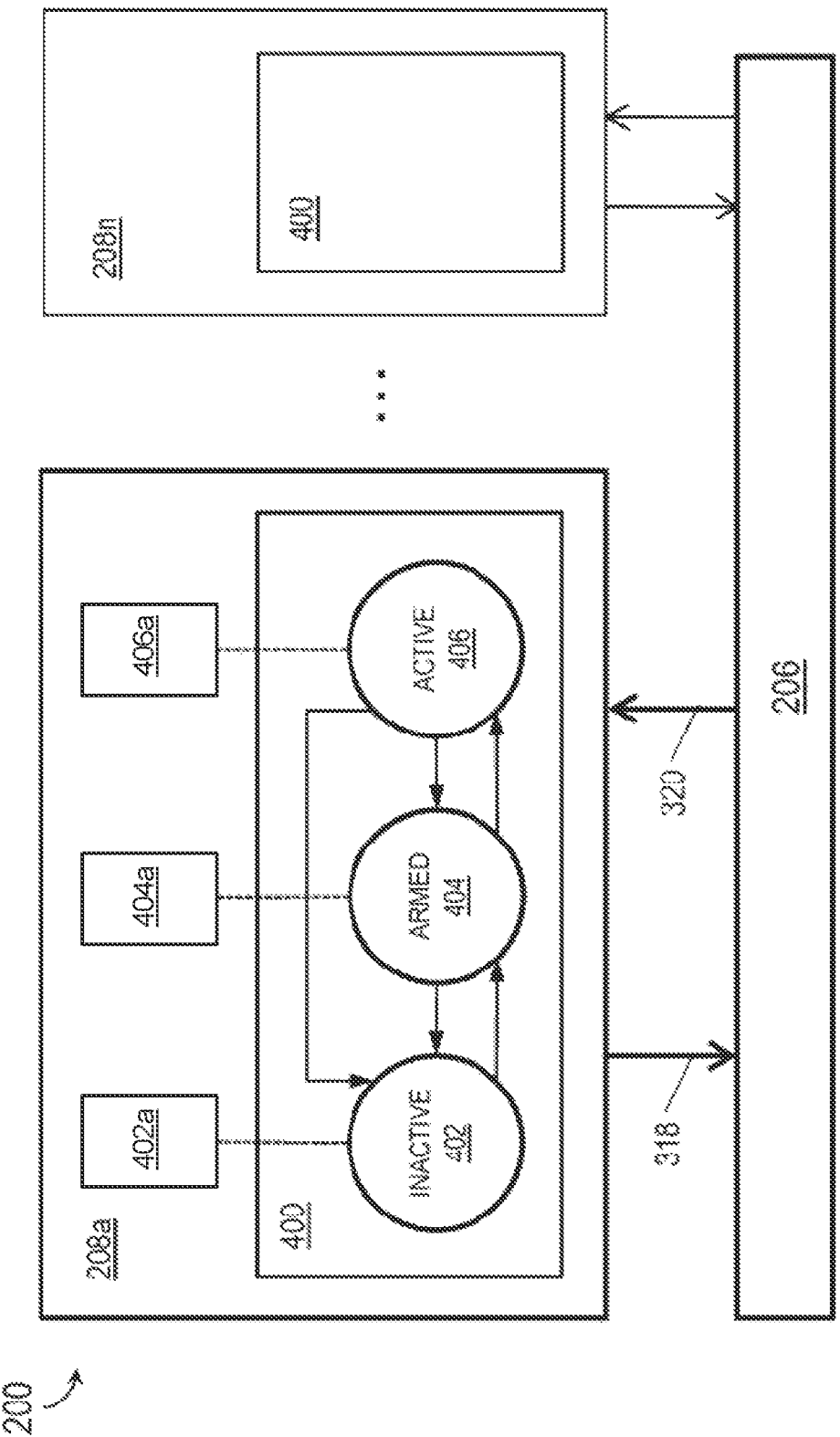
FIG. 4A is a block diagram illustrating application state transition operations of the vehicle arbitration system of FIG. 1.

FIGS. 4A and 4B—Application State Transitions and Tables

Referring to FIG. 4A, the Mth arbitration layer 200 is disclosed. The Mth arbitration layer 200 may include an arbitrator application programming interface 400 (API) for each arbitrator 206.

In embodiments, individual applications 208a-n in communication with their associated arbitrator 206 may at any time have an "inactive" status 402, an "armed" status 404, or an "active" status 406. For example, the statuses of all applications in communication with the arbitrator 206 are maintained by the arbitrator API 400. Each application 208a-n wishing to transition to a new status from its current status transmits a transition request 318 to its arbitrator 206; e.g., an "inactive" application (402) may wish to "arm" (404); an "armed" application 404 may wish to become "active" (406). The arbitrator API 400 may approve transition requests 318 via a transition command 320. In embodiments, the arbitrator 206 uses transition commands to update the status of the application 208a-n (e.g., from "inactive" (402) to "armed" (404); from "armed" to "active" (406); from "active" to "inactive") and to call the appropriate app function (e.g., each application 208a-n includes an inactive app function 402a, an armed app function 404a, and an active app function 406a) based on the updated application status. In embodiments, an "inactive" application (402) requesting (318) "inactive" status may be indicative of an error state and may be reported (FIG. 2, 200d) to the (M+1)th arbitration layer (FIG. 2A, 202) directly above or to the HMI/APMI (214/216, FIG. 2A).

Referring also to FIG. 4B, the arbitrator transition table 316 is disclosed.

In embodiments, the arbitrator transition table 316 may define state transitions and priorities for the subject applications 208a-n of the arbitrator 206. For example, the arbitrator transition table 316 may define the "armed" status (404, FIG. 4A) of the subject applications 208a-c of the arbitrator 206 when another subject application (e.g., an "armed" application) requests "active" status (406, FIG. 4A) and is selected to become the "active" application. For example, upon the transition to "active" status 406, the arbitrator 206 may request that the subject applications 208a, 208c transition to "armed" status 404 (as indicated by the arrowheads 410, 412) and the subject application 208b transition to "inactive" status (402, FIG. 4A), as indicated by the absence of arrowheads.

In embodiments, the arbitrator transition table 316 may indicate the priority levels of subject applications 208a-c, for resolving questions of application priority. For example, when the HOLD application 208d is "active", the "armed" APP 1 208a (priority level 1) and APP 2 208c (priority level 2) may both request "active" status 406 at the same time. The arbitrator 206 may select the subject application APP 1 208a having the higher priority level 1 to become "active" (414). If APP 1 208a then becomes "active" (406), the arbitrator 206 may request that subject applications APP 2 208b and APP 3 208c transition to "armed" status 404.

In embodiments, the arbitrator transition table 316 may also address state transitions when the "active" application can no longer be "active" (e.g., and requests transition to "inactive" status (402)). For example, if APP 2 208b is currently "active", the arbitrator 206 may request APP 1 208a (having priority level 1) become "active" (418). If for any reason APP 1 208a cannot become "active", the arbitrator may continue down the priority list until a subject application can activate, requesting (422) a subject application having priority level 2 activate next. If the HOLD application 208d cannot activate, the arbitrator 206 will set the HOLD application to "armed" (404) and the remaining applications 208a-c to "inactive" (402).

FIG. 5—Layer Transition Table

Referring also to FIG. 5, the layer transition table 500 may be implemented similarly to the arbitrator transition table 316 of FIG. 4B, except that the layer transition table 500 may define sequential transitions and/or priorities between the subject applications 308, 310, 312 of multiple arbitrators, e.g., the lateral axis arbitrator 302, vertical axis arbitrator 306, and longitudinal axis arbitrator 304 of the path arbitration layer (106, FIG. 3A).

In embodiments, when the lateral application 308 transitions to "active", the lateral axis arbitrator 302 may request (502; e.g., via layer transition message (218, FIG. 2)) the vertical axis arbitrator 306 make the vertical application 310 "armed". Accordingly, when the vertical axis arbitrator 302 transitions the vertical axis application 310 to "active", the vertical axis arbitrator 306 may request (504) the longitudinal axis arbitrator 304 make the longitudinal application 312 "armed".

Similarly, in embodiments the layer transition table 500 may define sequential state transitions when, for example, the lateral application 308 can no longer be "active" and transitions to "inactive" status. For example, the lateral axis arbitrator 302 may request (506) the vertical axis arbitrator 306 transition to "inactive" the vertical application 310, and the vertical axis arbitrator in turn may request (508) the longitudinal axis arbitrator 304 transition to "inactive" the longitudinal application 312. In some embodiments, the lateral axis arbitrator 308 may directly request (510) the longitudinal axis arbitrator 304 transition to "inactive" the longitudinal application 312.

Figure 6:
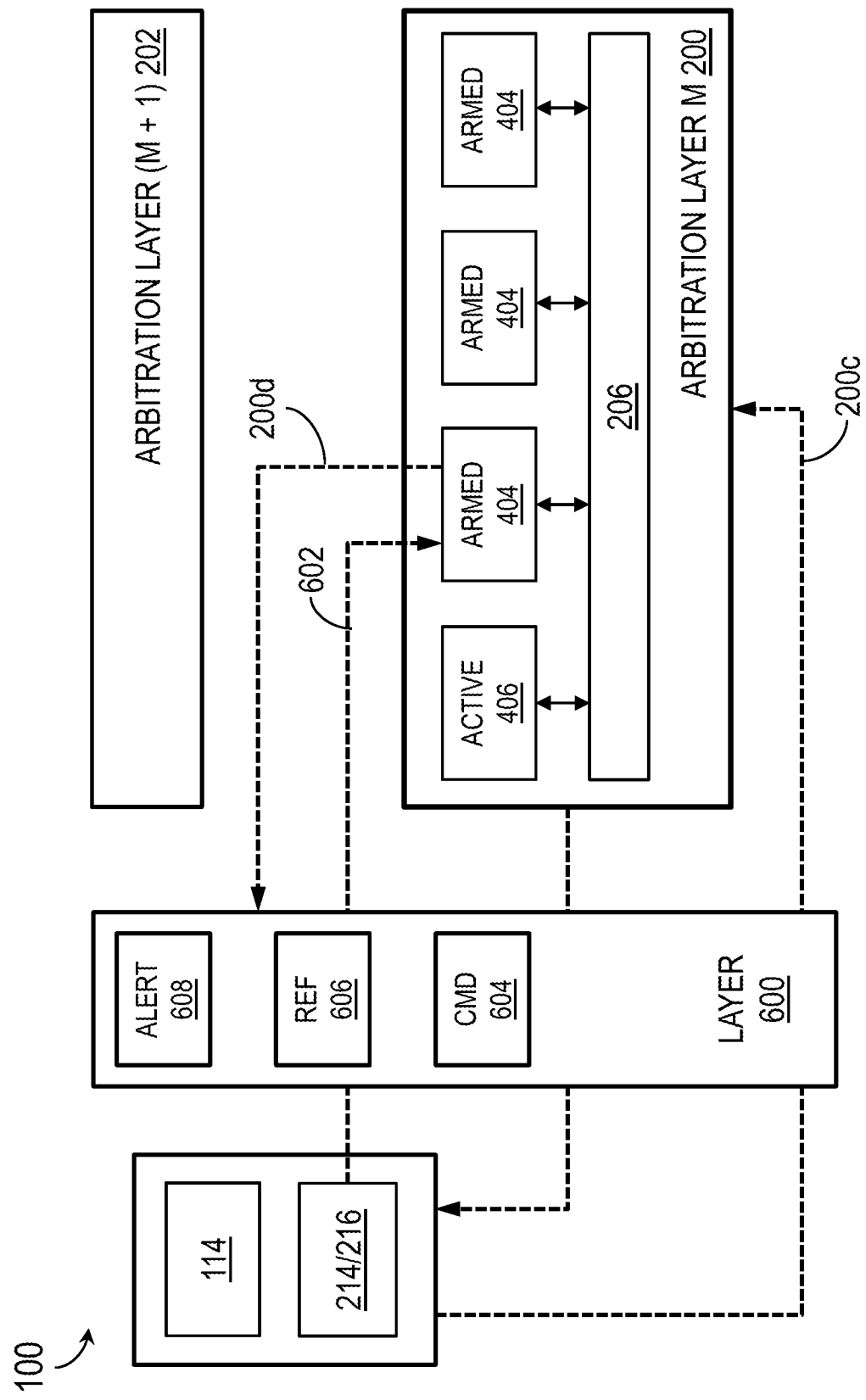
FIG. 6 is a block diagram illustrating a layer manager of the vehicle arbitration system of FIG. 1.

FIG. 6—Layer Manager

Referring to FIG. 6, the vehicle arbitration system 100 is disclosed. The vehicle arbitration system 100 may include layer manager 600 (e.g., mode manager) and human machine interface/artificial pilot machine interface (HMI/APMI) 214/216.

In embodiments, while the HMI/APMI 214/216 may receive control input submitted by a human or artificial pilot, the vehicle arbitration system 100 may be isolated from direct interface with the HMI/APMI 214/216 by the layer manager 600. For example, the layer manager 600 may isolate the HMI/APMI 214/216 and the arbitration layers (102-112, FIG. 1; 200-204, FIG. 2A) of the vehicle arbitration system 100 via layer manager components dedicated to specific types of user interfaces (e.g., display modes, display cues, display references, display alerts).

In embodiments, the layer manager 600 may convert pilot mode requests (e.g., selects and/or deselects from human or artificial pilots) into toggle-mode messages, allowing the pilot to directly select (602) an "armed" application 404 to make "active" (406) at any desired Mth arbitration layer 200.

In embodiments, the layer manager 600 may include a command manager 604. For example, the command manager 604 may analyze application status information (202*d*) and cue commands from the arbitrators 206 to update cues (e.g., command information) displayed (e.g., via the HMI/APMI 214/216 or display systems (114, FIG. 1)) to the pilot. In embodiments, the command manager 604 may analyze the validity of application status and error information 200*d* to determine and report error states and related information via the HMI/APMI 214/216. For example, the command manager 604 may interpret a conflict or divergence between pilot cue information and application status information from the attitude arbitration layer (108*d*, FIG. 1) as an error condition (e.g., that a command signal from the pilot/operator is not being followed) that may require corrective action (e.g., a change of "active" application 406 or a change of references).

In embodiments, the layer manager 600 may include a reference manager 606. For example, the reference manager 606 may serve as a source and arbiter of truth for all reference values used by the vehicle arbitration system 100. Reference values may be changed by multiple applications or modes (e.g., limited in value, invalidated) or stored to volatile or non-volatile memory; while copies of each reference value may be maintained locally in each function, write access may be limited depending on the current "active" application 406. In embodiments, the reference manager 608 may maintain all reference values while managing write permissions based on the "active" application 406. Accordingly, the reference manager 606 may provide synchronized references or independent references (e.g., for a pilot and co-pilot) as needed; for example, any references displayed by the HMI/APMI 214/216 or display systems 114 may be read and written via the reference manager.

In embodiments, the layer manager 600 may include an alert manager 608. For example, the alert manager 608 may monitor the validity of "active" or "armed" applications (406, 404) as well as multiple application status/error information signals (200*d*, 112*d*; FIG. 1), generating and clearing alert conditions (and reporting alerts to the pilot via the HMI/APMI 214/216 and/or display systems 114) as needed.

Conclusion

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A modular guidance system comprising:
  a control system that provides a control input to a vehicle arbitration system;
  a flight display that includes a primary flight display, or a multifunctional display, or a remote display, wherein the flight display displays control outputs to an operator of the modular guidance system; and
  a vehicle arbitration system that controls the modular guidance system and sends control outputs to the flight display, the vehicle arbitration system comprising:
    a plurality of arbitration layers, wherein each arbitration layer includes a plurality of flight objectives describing vehicle control objectives;
      wherein the plurality of arbitration layers is organized in a hierarchy, such that the highest arbitration layer in the hierarchy includes a plurality of flight objectives that provide a general description of vehicle control and each arbitration layer lower in the hierarchy includes a plurality of flight objectives that provide a more specific description of vehicle control than arbitration layers higher in the hierarchy;
    wherein each arbitration layer comprises an arbitrator, a decision agent, and an application;
    wherein each arbitration layer:
      groups at least one arbitrator, one application, and one decision agent together based on a plurality of flight objectives;
      receives control signals from another arbitration layer;
      receives control inputs from the control system, wherein the control inputs are associated with a current flight objective; and
      sends control signals to another arbitration layer or sends control outputs to the flight display;
    wherein each arbitrator:
      receives control inputs from the control system, wherein the control inputs are associated with a current flight objective;
      receives control signals from an arbitration layer;
      associates each application with an application state that is inactive, or armed, or active;
      receives a request for control of the modular guidance system from a first application;
      refers to a first decision agent when a plurality of requests is received from a plurality of applications; and
      selects and temporarily grants control of the modular guidance system to an armed application based on control signals and the first decision agent;

wherein each decision agent:
aids an arbitrator in choosing the armed application to grant control of the modular guidance system;
wherein each application:
receives control inputs from the control system, wherein the control inputs are associated with a current flight objective;
receives control signals from an arbitration layer;
requests control of the vehicle arbitration system from a first arbitrator;
receives control of the vehicle arbitration system from the first arbitrator;
fulfills a flight objective by executing one or more functions while in an active state;
generates control signals or control outputs; and
sends control signals to another arbitration layer and sends control outputs to the flight display, such that control inputs are used by the vehicle arbitration system to control a vehicle.

2. The modular guidance system of claim 1, wherein:
the first decision agent assigns a priority to each application; and
an arbitrator transitions to the active state an armed application that has a highest priority.

3. The modular guidance system of claim 2, wherein the first decision agent includes an arbitrator transition table associated with the priority to each application.

4. The modular guidance system of claim 2, wherein the first decision agent includes a decision module that:
assigns an application priority; and
selects the first application for transition to the active state.

5. The modular guidance system of claim 1, wherein the first arbitrator fulfills the current flight objective in coordination with a second arbitrator that is in communication with a second application.

6. The modular guidance system of claim 5, wherein the first decision agent includes a layer transition table corresponding to the coordination of the first arbitrator and the second arbitrator.

7. The modular guidance system of claim 6, further comprising a mode manager communicatively coupled to a first arbitration layer that:
receives a control input from the control system;
receives control signals and status information from a second arbitration layer;
directs the control system to display control outputs to the operator based on the received control signals and status information; and
allows the operator to directly change an application in the vehicle arbitration system from the armed state to the active state.

8. The modular guidance system of claim 7, wherein the mode manager includes a command manger that:
analyzes application status information from the plurality of arbitration layers; and
sends control outputs to the flight display to update information displayed to operator.

9. The modular guidance system of claim 8, wherein the command manger:
analyzes the validity of application status and error information; and
sends errors as control outputs to the flight display.

10. The modular guidance system of claim 7, wherein the vehicle arbitration system creates reference values, and the mode manager includes a reference manger that:
stores all reference values; and
manages write permissions for the plurality of arbitration layers.

11. The modular guidance system of claim 7, wherein:
the operator is selected from: a human pilot; an artificial pilot; and a remote arbitrator; and
the control system is selected from a human/machine interface (HMI); an artificial pilot machine interface (APMI); and a display system.

12. The modular guidance system of claim 1, wherein each arbitrator in the plurality of arbitration layers transmits status information and error information to another arbitration layer.

13. The modular guidance system of claim 1, wherein each arbitrator in the plurality of arbitration layers receives status information and error information from another arbitration layer.

14. The modular guidance system of claim 1, wherein the plurality of arbitration layers are selected from:
a goal-based arbitration layer associated with a fulfillment of a mission objective;
a route-based arbitration layer associated with a movement of the modular guidance system from a first location to a second location via a path;
a path-based arbitration layer associated with a completion of the path;
an attitude-based arbitration layer associated with maintaining an attitude of the modular guidance system;
a flight control based arbitration layer associated with implementing a flight control of the modular guidance system, the flight control associated with an actuator and a control surface of the modular guidance system; and
an actuator-based arbitration layer associated with controlling the actuator and the control surface.

15. The modular guidance system of claim 1, wherein the vehicle arbitration system includes a certification kit, wherein the certification kit ensures that any new arbitrator or application added to the plurality of arbitration layers is safe, secure, and certifiable.

16. The modular guidance system of claim 15, wherein the certification kit enforces safety and certification requirements on a layer-by-layer basis.

17. The modular guidance system of claim 1, wherein each arbitrator sends control signals to another arbitration layer and sends control outputs to the flight display.

\* \* \* \* \*